3,074,780
ACIDIC PHOSPHATIC SOLUTIONS
Donald J. Smalter, Lakeland, Fla., assignor to International Minerals & Chemical Corporation, a corporation of New York
No Drawing. Filed July 5, 1960, Ser. No. 40,532
6 Claims. (Cl. 23—165)

The present invention generally relates to acidic phosphatic solutions. More particularly the invention relates to the defluorination of acidic phosphatic solutions. Still more particularly the invention relates to a process for defluorinating acidic phosphatic solutions containing fluorine in excess of that permissible in animal feed grade phosphates to produce an acidic phosphatic solution of substantially reduced fluorine content so that it may be used directly to prepare animal feed ingredients.

There has developed in recent years a substantial market for phosphates, such as inter alia, calcium phosphates, sodium phosphates, and potassium phosphates, of a grade and quality useful as an animal feed supplement. In feed grade phosphates, the weight ratio of phosphorus, calculated as elemental phosphorus, to fluorine, calculated as elemental fluorine, is preferably greater than about 50, and still more preferably greater than about 100.

Feed grade phosphates may be produced directly from acidic phosphatic solutions provided the fluorine content of the solution is not too high. However, inasmuch as phosphate rock in the natural state contains significant amounts of fluorine, acidic phosphatic solutions prepared from phosphate rock also contain significant amounts of fluorine.

The prior art has proposed the defluorination of solutions of fluorine-containing phosphatic solutions, such as acidulated phosphate rock extracts, by addition thereto, inter alia, of alkali metal ions, preferably in the form of solutions of alkali metal salts, such as sodium and potassium chlorides, and the like, to form precipitates containing the fluorine. However, such alkali metal defluorination processes present filtration problems and are not altogether satisfactory for producing a defluorinated extract or solution from which a phosphate product of animal feed grade can be produced directly.

Hettrick, U.S. Patent No. 2,165,100, presents a process wherein wet process phosphoric acid is defluorinated by passing superheated steam therethrough. The Hettrick process, however, has not been a commercial success because it utilizes uneconomically large quantities of steam and the fluorine is stripped from the solution at a slow rate. A further serious drawback of the Hettrick process has been the problem of foaming which has the very marked effect of reducing the fluorine removal rate by from about 50% to about 90%. Addition of anti-foaming agents has been of no substantial benefit because they failed to substantially improve the rate of fluorine evolution and in some cases actually decreased the rate of fluorine evolution.

It is an object of the present invention to provide a method for defluorinating acidic phosphatic solutions containing significant amounts of fluorine.

It is another object of this invention to provide a commercially feasible method of defluorinating wet process phosphoric acid solutions by the use of steam.

It is a further object of the invention to provide a process for the steam defluorination of wet process phosphoric acid in which a substantially defluorinated product having a P/F of at least 50 may be produced.

It is an additional object of this invention to provide a method of defluorinating phosphoric acid whereby the foaming problem is eliminated or at least substantially reduced.

These and other objects and advantages of the present invention will be apparent from the specification.

Now, in accordance with the present invention, there is provided a process for defluorinating an aqueous acidic phosphatic solution containing fluorine which comprises introducing said acidic phosphatic solution into a liquid-steam contacting zone and simultaneously introducing steam into contact with said acidic phosphatic solution, said steam being employed at a predetermined rate and temperature to boil said acidic phosphatic solution, and continuing to contact acidic phosphatic solution with steam at a predetermined rate and temperature to boil the acidic phosphatic solution for a time period requisite to reduce the fluorine content to a level at which the defluorinated acidic phosphatic solution is suitable for use in the manufacture of animal feeds, the total amount of steam introduced being greater than 1.25 pounds of steam per pound of $P_2O_5$ in the acidic phosphatic solution being defluorinated, and thereafter recovering the defluorinated acidic phosphatic solution.

The process of the invention may be effected batchwise or continuous. The process may be effected batchwise by simultaneously adding to a liquid-steam contacting zone the acidic phosphatic solution, such as concentrated wet process phosphoric acid, and steam, the steam being at a temperature higher than the boiling point of the acid solution at its ultimate concentration level, the acid being added in small increments or at a low rate such that the acid is always maintained at the boiling point and condensation of the steam is substantially eliminated until the contacting zone is filled. After all the acid has been added to the contacting zone, steam addition is continued for a time period requisite to reduce the fluorine content to the desired level.

The process may also be effected in a continuous manner. The defluorination may be effected in a continuous manner in a plurality of stages by simultaneously adding the acidic phosphatic solution, such as concentrated wet process phosphoric acid, and steam, simultaneously to a first treatment stage of at least two stages operating in series, the steam being employed at a predetermined rate and temperature to boil the acid, passing the partially defluorinated acid from the first stage to a second stage, contacting the acid in said second stage with steam at a predetermined rate and temperature to boil the acid, and discharging from the last treatment stage an acid solution of substantially lower fluorine content.

The invention generally finds utility in conjunction with processes which entail acidulation of phosphate rock, extraction of the solubilized phosphate values of the acidulated rock with an aqueous medium, and processing the phosphate-rich extract so obtained to produce a high analysis fertilizer or a feed grade dicalcium phosphate, or both, or potassium phosphate, or sodium phosphate.

The process of the invention finds utility in defluorinating acidic phosphatic solutions formed by the leaching of acidulated phosphate rock with an aqueous medium. The aqueous acidic phosphatic solution may constitute substantially calcium-free phosphoric acid, or depending upon the degre of acidulation, approach monocalcium phosphate solution characterized by a $CaO/P_2O_5$ mole ratio of about 1:1. The invention is useful in the reduction of fluorine in all such solutions and more specifically is applicable to aqueous acidic phosphatic solutions ranging from phosphoric acid to monocalcium phosphate.

The wet process phosphoric acid solution resulting from extracting phosphate rock, which has been acidulated with sulfuric acid, with an aqueous medium generally contains between about 26% and 32% $P_2O_5$, at least 0.5% fluorine, iron phosphate, aluminum phosphate, sulfate ion and other impurities. Passage of steam through dilute acidic phosphatic solutions, such as wet process phosphoric acid, having a $P_2O_5$ concentration of from about 26% to about 46% is, however, relatively ineffective, that is large volumes of steam per unit of $P_2O_5$ treated remove only small amounts of fluorine. It has been determined that the fluorine may be more efficiently removed in the process of the invention when the $P_2O_5$ content is at least 48% $P_2O_5$ by weight, more preferably at least 50% $P_2O_5$ by weight and more preferably in the range between about 54% and about 58%. As the concentration of $P_2O_5$ rises, fluorine removal is more easily effected. At a concentration of from 54% to 58% $P_2O_5$, a typical sample of wet process phosphoric acid has a viscosity of 400 centipoises at 100° F. and 25 centipoises at 250° F. and has an analysis as follows:

| | | |
|---|---|---|
| $P_2O_5$ | percent | 56.0 |
| Fluorine | do | 1.4 |
| $Al_2O_3$ | do | 2.0 |
| $Fe_2O_3$ | do | 2.5 |
| $SO_4$ | do | 3.0 |
| P/F | | 17.5 |

The presence of the sulfate constituent or free sulfuric acid in the phosphoric acid appears to aid defluorination. Sulfate concentrations in an amount between about 2 and 4% by weight of the solution are generally preferably maintained.

The dilute acidic solution may be concentrated by any one of a number of known methods, for example, in a Kestner evaporator equipped with lead tubes, and defluorination is caused to occur during the latter stages of concentration or subsequent to the concentration. For optimum fluorine removal, it is preferred to first effect substantially all of the concentration and then to initiate steam defluorination. The acid is preferably concentrated to a concentration higher than 48% $P_2O_5$ and preferably higher than about 50% $P_2O_5$. At concentrations below the range of 48% to 50% $P_2O_5$, the effectiveness of steam defluorination falls off rapidly.

When the concentration is accomplished by means of direct fired or submerged combustion evaporators, the acid is generally concentrated in stages, the acid of predetermined concentration overflowing from a low concentration stage to a higher concentration stage, until a concentration approaching at least 50% and preferably about 54% $P_2O_5$ is reached in the last stage.

The process of the invention is effective in reducing the fluorine content of acidic phosphatic solutions which contain fluorine in an amount which renders the acidic phosphatic solution unsuitable for direct use in preparing a phosphatic animal feed supplement. While there is no absolute standard with respect to this point, when the ratio of P/F is less than about 50 in the acidic phosphatic solution, the solution is generally unsuitable for preparing an animal feed supplement directly therefrom. It is generally preferable that the acidic phosphatic solution have a P/F of at least 50 and more preferably at least 100 when it is used to prepare an animal feed supplement therefrom. The process of the present invention is eminently suitable for reducing the fluorine content of acidic phosphatic solutions having a P/F of less than 50 to produce a P/F ratio of at least greater than 50, usually greater than 100. Commercial wet process phosphoric acid generally has a fluorine content of at least 0.5% and usually within the range of from 0.5% to 2.5% by weight. The process of the present invention effectively reduces the fluorine content of such wet process phosphoric acid to produce a substantially defluorinated acid having the desired P/F weight ratio which is at least 50 and preferably at least 100.

In the process of the present invention, wet process phosphoric acid, or other aqueous acidic phosphatic solution, of at least 48% and more preferably of at least 50% $P_2O_5$, and containing at least 0.5% fluorine, is treated by simultaneously adding to a liquid steam contacting zone, acid and steam. The steam must be at a temperature higher than the boiling point of the acid solution at its ultimate concentration level and it is added at a rate sufficient to boil the acid, preferably to vigorously boil the acid. The steam is generally at a temperature above 300° F. and preferably is above 320° F. The steam rate is preferably at least 0.25 pound of steam per pound of acidic phosphatic solution being introduced into the contacting zone and is more preferably at least 0.50.

The concentrated acidic phosphatic solution is added in small increments or at a slow rate such that the acidic solution is always maintained boiling and condensation of the steam is substantially eliminated. The acidic solution entering the liquid-steam contacting zone is preferably at a temperature between about 250° F. and the boiling point of the solution, which at 56% $P_2O_5$ concentration is about 305° F. The acid removed from an acid concentration zone may already be at a temperature above about 250° F. and may, therefore, be passed directly into the liquid-steam contacting zone. If necessary, however, the acid may be heated to a temperature of at least 250° F.

Efficiency of fluorine removal is dependent upon the fluorine content of the phosphoric acid solution, i.e., weight ratio of phosphorus to fluorine and the rate at which steam is passed through the phosphoric acid. Fluorine removal varies directly with the concentration. At the beginning of defluorination, when the fluorine level is highest, fluorine is more readily removed at any fixed steam rate.

In accordance with the present invention the acidic phosphatic solution is contacted with steam in a liquid-steam contacting zone, the steam being provided at a temperature and rate to boil the acidic phosphatic solution, and as the fluorine is driven out of the solution it is preferable to effect an increase in the ratio of the amount of acidic phosphatic solution to the rate of steam.

The process of the present invention may be effected by introducing the acidic phosphatic solution into a contacting or treatment zone wherein sparging steam is being discharged in quantities controlled to maintain the accumulating acidic phosphatic solution in boiling condition. The steam is discharged from diffusing equipment designed to produce a large volume of very fine steam bubbles into the bottom of the contacting zone at a predetermined rate. This rate may be just sufficient to boil the acidic phosphatic solution in the zone and subject to increase of steam rate as the acidic phosphatic solution is accumulated in the contacting zone, or the steam may be discharged at the ultimate rate from the beginning. It is preferable that the operation be effected so that there is an increase in the ratio of the amount of acid in the contacting zone to the rate of steam introduction into the zone as fluorine is driven out of the acidic phosphatic solution.

In the batch type of operation the acid is preferably added to the contacting zone at a slow enough rate so that at least ½ hour is required to fill the contacting zone to the desired level. When operating at such conditions, at least 25%, and more generally at least 35%, of the amount of fluorine that is ultimately driven out of the acidic phosphate solution in the process of this invention is removed from the solution as the zone is being filled to the desired level. In the batchwise operation, after the zone is filled to the desired level, the steam addition is continued at a temperature and rate to boil the acid until the fluorine content is reduced to the desired level, which, as is hereinbefore set forth, is when the acidic solution has a P/F ratio high enough to render the acid suitable for direct use to prepare an animal feed to supplement therefrom; that is, the P/F ratio is increased to at least 50 and preferably to at least 100. The rate of steam addition is preferably at least 0.25 pound of steam per pound of acidic phosphatic solution in the contacting zone and more preferably at least 0.50. The total amount of steam used is usually greater than 1.25 pounds of steam per pound of $P_2O_5$ in the phosphatic solution being defluorinated. The total amount of steam may, however, be higher and is greater than 2.5 and still more usually greater than 3.5 pounds of steam per pound of $P_2O_5$. The steam is at a temperature of at least 300° F. and preferably of at least 320° F. The time required to fill the contacting zone to the desired level may also be expressed in terms of the entire time necessary to accomplish the desired amount of fluorine removal. At least 10%, and preferably at least 20%, of the total steaming time is utilized in filling the contacting zone. The total steaming time is generally greater than 2.5 hours, preferably greater than 3.0 hours and usually within the range from about 3.5 hours to 10 hours.

As hereinbefore set forth, the steam treatment may be carried out in a multiplicity of steaming stages or zones in series as well as in a single stage batch operation. When treating in multiple stages, steam and acid are simultaneously introduced into the first stage and acid overflowed from the first stage to the second stage where steam is likewise introduced adjacent the bottom. Liquid may be overflowed from the second stage to the third stage until the third stage has been filled with acid. Steam is likewise introduced adjacent the bottom of the third stage contacting zone. Feed may be continuous to the first stage until all three stages hold the predetermined optimum quantity of acid, at which time acid flow is stopped but steam flow is continued until the initial fluorine content of the acidic phosphatic solution which is greater than 0.5% and generally from 1 to 1.8% is reduced to the desired level where the P/F ratio is at least 50 and preferably at least 100. The steaming may be continued to reduce the fluorine concentration to an amount in the range between about 0.1% and 0.01% by weight. Each stage of defluorination may be carried out continuously or batchwise. Generally, the first stage is operated on a continuous basis and subsequent stages are operated either continuously or as a batchwise operation.

Defluorination to less than 1000 p.p.m. can be accomplished in less than 5 hours, generally with a treatment period of about 4 to 4½ hours. A typical wet process phosphoric acid can be reduced to less than 1000 p.p.m. in about 4 hours for 8500 gallon batches in treatment zones 3½ feet deep utilizing about ¾ to 1 pound of steam per hour per pound of $P_2O_5$ (or 3½ to 4½ pounds of steam total per pound $P_2O_5$) in the acidic phosphatic solution. Steam rates and temperature will vary with acid concentrations and treatment zone depth, but, in general, for acid concentrations of 50 to 56% $P_2O_5$, it is desirable to maintain the acid being defluorinated at a temperature between about 300° F. and 320° F. with the higher temperature range of 310 to 320° F. preferred because the fluorine stripping rate at 310° F., for example, is double the rate obtained at a temperature of about 290° F.

In order to maintain a substantially constant acid concentration and boiling point when conditions are maintained such that steam cannot condense and the overall effect is of vaporizing some of the water from the phosphoric acid solution, water may be fed back into the contacting zone. This operation may also be utilized to introduce 1 to 2% by weight of silica in the finely divided form whereby the stripping rate can be improved by from 30 to 70%.

The stripping operation herein described, with the acid being treated under the above described conditions, does not give rise to foaming problems despite the presence of organic material. A typical wet process phosphoric acid having an initial P/F weight ratio of about 18, being treated under the same conditions of steam, volume, and temperature, but to which has been added an antifoaming agent, shows a final P/F after a 5 hour steam treatment of approximately 50 to 60, whereas the material properly steamed in the absence of antifoaming agents for the same period shows a P/F of about 180. Since the foaming agents fail to eliminate the foaming problem and fail to permit the fluorine stripping operation to be carried out effectively, it will be seen that the procedure of this invention converts the steam contacting operation previously known from an uneconomical process to an economical process.

In order to give a fuller understanding of the invention, but with no intention to be limited thereto, the following specific examples are given.

EXAMPLE I

Wet process phosphoric acid was manufactured by the digestion of Florida phosphate rock with sulfuric acid. Upon filtering out solids, a solution was obtained of about 26% $P_2O_5$ content. This acid was evaporated to approximately 50% $P_2O_5$ concentration. The concentrated acid had an analysis as follows:

| | |
|---|---|
| $P_2O_5$ | percent 51.90 |
| Fluorine | do 1.28 |
| $Al_2O_3$ | do 1.90 |
| $Fe_2O_3$ | do 3.10 |
| $SO_4$ | do 3.10 |
| P/F | 18 |

Test 1

3,500 volume units of this acid was introduced into a tank equipped with steam sparging equipment in the bottom thereof. Acid depth was 3½ feet. Steam of approximately 500° F. temperature was passed through the tank of acid for 5 hours at a rate of about 0.7 pound of steam per hour per pound of $P_2O_5$ in the treated solution. The temperature of the steaming acid was maintained at approximately 310° F. Unfiltered phosphoric acid at the end of the 5 hour steam sparging operation, analyzed as follows:

| | |
|---|---|
| $P_2O_5$ | percent 53.0 |
| P/F | 32 |
| $Al_2O_3$ | percent 2.0 |
| $Fe_2O_3$ | do 3.2 |
| Sulfate | do 3.0 |

Test 2

Another portion of the 51.90% $P_2O_5$ phosphoric acid containing 1.28% fluorine was processed as follows. Steam of approximately 500° F. was discharged through diffusing equipment in the empty steaming tank used in the operation discussed in Test 1. Pumping of 55% $P_2O_5$ acid was started immediately thereafter at a rate of 50 volume units per minute. This acid at the time of entering the steam contacting acid was at a temperature of 285° F. The time required to fill the steam contacting tank was approximately 75 minutes. Steaming was continued for approximately 3¾ hours, giving a total steaming period of approximately 5 hours. Unfiltered phosphoric acid, at the end of the sparging operation, analyzed as follows:

| | |
|---|---|
| $P_2O_5$ | percent 56.7 |
| $Al_2O_3$ | do 2.0 |
| $Fe_2O_3$ | do 3.0 |
| Sulfate | do 3.3 |
| P/F | 247 |

Comparing the results of Test 1 with Test 2, it may be seen that Test 2, which followed the process of this invention, was much more effective in reducing the fluorine content of the phosphoric acid.

The description of the invention utilized specific reference to certain process details; however, it is to be understood that such details are illustrative only and not by way of limitation. Other modifications and equivalents of the invention will be apparent to those skilled in the art from the foregoing description.

This application is a continuation-in-part of copending application Serial No. 640,607, filed February 18, 1957, now abandoned.

Having now fully described and illustrated the invention, what is desired to be secured and claimed by Letters Patent is set forth in the appended claims.

I claim:

1. A method for defluorinating a fluorine-containing aqueous acidic phosphatic solution containing at least 48% by weight of $P_2O_5$ and more than about 0.5% by weight of fluorine which renders the acid unsuitable for use in the manufacture of animal feeds, which comprises introducing a stream of steam into an initially substantially empty liquid-steam contacting zone and substantially simultaneously introducing a stream of said acidic phosphatic solution into contact with said steam, said steam being employed at a predetermined rate and temperature to boil said acidic phosphatic solution, and continuing to contact acidic phosphatic solution with steam at a predetermined rate and temperature to boil the acidic phosphatic solution for a time period requisite to reduce the fluorine content to a level at which the defluorinated acidic phosphatic solution is characterized by a P/F weight ratio of at least about 50 and is suitable for use in the manufacture of animal feeds, the total amount of steam introduced being greater than 1.25 pounds of steam per pound of $P_2O_5$ in the acidic phosphatic solution being defluorinated, and thereafter recovering the defluorinated acidic phosphatic solution.

2. A method according to claim 1 in which the total amount of steam introduced is greater than 2.5 pounds of steam per pound of $P_2O_5$ in the acid being defluorinated.

3. A method according to claim 1 in which the total amount of steam introduced is greater than 3.5 pounds of steam per pound of $P_2O_5$ in the acid being defluorinated.

4. The method according to claim 1 in which the steam is introduced at a temperature between about 300° F. and about 500° F. and above the boiling point of the acidic phosphatic solution.

5. The method of claim 1 wherein the defluorination is effected batchwise.

6. The method of claim 1 wherein the defluorination is effected in a plurality of stages.

References Cited in the file of this patent

UNITED STATES PATENTS 2,962,357     Williams et al. _____ Nov. 29, 1960